Oct. 5, 1937.   ERICH-GÜNTHER KÖHLER   2,094,950
GUIDING AND HOLDING OF LONG METAL BANDS
Filed Nov. 12, 1935
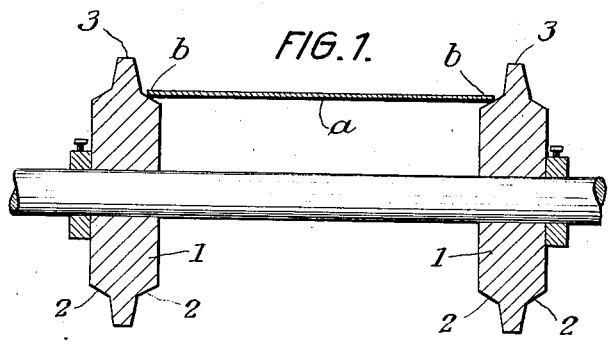
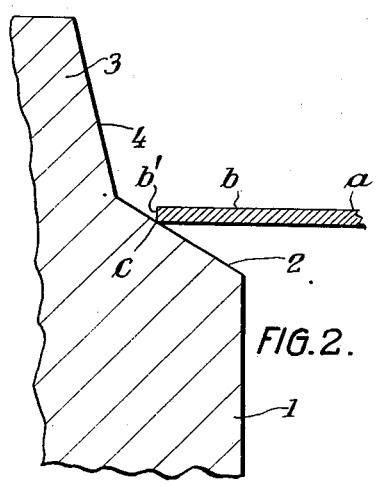
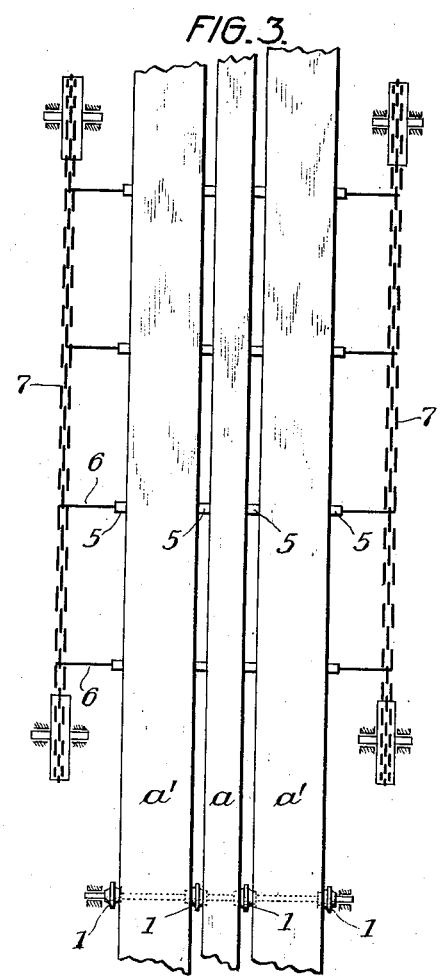
E.-G. Köhler   Inventor:
By Glascock Downing Seibold
Attys.

Patented Oct. 5, 1937

2,094,950

UNITED STATES PATENT OFFICE 2,094,950

GUIDING AND HOLDING OF LONG METAL BANDS

Erich-Günther Köhler, Andernach-on-the-Rhine, Germany, assignor to Remy, van der Zypen & Co., Andernach-on-the-Rhine, Germany Application November 12, 1935, Serial No. 49,434
In Germany May 28, 1935

3 Claims. (Cl. 193—37)

The guiding and holding of long metal bands presents difficulties, when such metal bands have a sensitive surface, as for instance provided with a sensitive tin or aluminium layer, a sensitive layer of varnish and the like. When such long or endless bands have to be moved while in the stretched-out state, for instance in travelling through a drying oven, or when they are conveyed, in order to cool them, through the air for some time before being reeled up, or have their direction of travel substantially altered, damage may easily be done to the band edges through their contact with the supporting rollers, pulleys or other guiding and supporting members.

With the device according to the invention these disadvantages are overcome, through the guiding or supporting members, for instance guiding rollers, being provided for guiding and holding long metal bands having a sensitive surface, while they are in motion, with guiding parts which are so constituted that the bands rest only with one corner of their edge on the guiding or supporting members.

The invention is illustrated by way of example and diagrammatically in the accompanying drawing, in which Fig. 1 is a cross-section through supporting members in the form of supporting rollers and an endless band guided by them;

Fig. 2, a portion of Fig. 1 to a larger scale;

Fig. 3, a plan view of a portion of a somewhat modified guiding device.

In the drawing, 1, 1 are the guiding rollers for an endless band $a$. The guiding rollers are provided with sufficiently inclined guiding surfaces 2, so that the band $a$ rests constantly on these guiding surfaces only with the corners $c$ of the edges of one side $b$, that it makes substantially only line or point contact. This ensures a proper guiding of the band, without the top or bottom surface or even the side surface $b'$ of one side $b$ of the band $a$ coming in contact with the part of the roller, which moves relatively to the band, whereby the sensitive coating might be damaged.

As a certain amount of lateral creeping of the band is possible the guiding rollers are provided with guiding means, for instance peripheral ribs 3 with inclined side surfaces 4, which always bring the band back on to the surfaces 2 of the guiding rollers, the contact between the surface 4 and the band $a$ also being only a linear or point contact.

As will be seen from Fig. 3 the guiding rollers are suitably provided with the inclined guiding surfaces on both sides, so that one guiding roller may be used for simultaneously guiding two adjacent bands $a$, $a'$.

In cases where such bands are to be held by means of supporting members which have the same speed of motion as the band, that is travel with it, supporting members 5 will suitably be used, which are mounted for instance on transverse bars 6 of an endless chain 7, in which case they will with advantage be capable of sliding on these transverse bars.

What I claim is:—

1. A device for guiding and supporting long metal bands with a sensitive surface, while they are in motion, comprising in combination guiding rollers having inclined supporting surfaces at their periphery with an inclination of at least 15 degrees and a high guiding rib adjacent thereto sufficiently inclined to return a creeping band to the inclined supporting surfaces.

2. A device for guiding and supporting long metal bands with a sensitive surface, while they are in motion, comprising in combination guiding rollers having inclined supporting surfaces at their periphery with an inclination of at least 15 degrees and a high guiding rib adjacent thereto with at least one side surface sufficiently inclined to return a creeping band to the inclined supporting surfaces.

3. A device for guiding and supporting long metal bands with a sensitive surface, while they are in motion, comprising in combination guiding rollers having inclined supporting surfaces at their periphery with an inclination of at least 15 degrees and a high peripheral guiding rib adjacent thereto and disposed in the central plane of the roller with at least one surface inclined sufficiently to return a creeping band to the inclined supporting surfaces.

ERICH-GÜNTHER KÖHLER.